UNITED STATES PATENT OFFICE.

HAROLD S. BOOTH, OF ITHACA, NEW YORK, AND GEORGE G. MARSHALL, OF CLEVELAND, OHIO.

PROCESS OF RECOVERING BERYLLIUM FROM ORES, MINERALS, AND OTHER MATERIALS.

1,392,046.  Specification of Letters Patent.  Patented Sept. 27, 1921.

No Drawing.    Application filed October 16, 1918. Serial No. 258,446.

*To all whom it may concern:*

Be it known that we, HAROLD S. BOOTH and GEORGE G. MARSHALL, citizens of the United States, and residents, respectively, of Ithaca, in the county of Tompkins and State of New York, and Cleveland, in the county of Cuyahoga and State of Ohio, have invented a certain new and useful Improvement in Processes of Recovering Beryllium from Ores, Minerals, and other Materials, of which the following is a full, clear, and exact description.

This invention relates to a process for the recovery of beryllium from ores, minerals and other materials in which it may be found.

This application is a continuation of certain portions of our co-pending application, Serial No. 204,004, filed Nov. 26, 1917.

The most usual form in which beryllium is found in nature is as the mineral beryl, which is usually expressed by the formula $Be_3Al_2(SiO_3)_6$, and the various reactions which will be herein discussed with respect to the process are based upon the recovery of beryllium from this mineral. However, no limitation is intended to be implied from this fact, as the success of the process herein disclosed does not depend upon the particular mineral used but upon the fact that a beryllium containing material will under the proper conditons react with a halogen and form a halogen compound of beryllium which may be recovered in several different ways.

In the application before mentioned we particularly pointed out the manner in which a beryllium containing material could be mixed with a halogen compound such as sodium chlorid or calcium chlorid, and by the application of suitable heat, beryllium chlorid would be formed which could be recovered.

Briefly stated, this process consists in mixing the mineral in suitably crushed form with a halogen compound such as calcium chlorid or sodium chlorid, preferably having the materials in anhydrous condition, and also having silica present, either as a part of the original material containing beryllium, or added thereto, and charging the mixture into an electric furnace, heating the mixture, to a proper temperature in the neighborhood of 1500 C., under which conditions there is produced beryllium chlorid which is recovered either by volatilizing the chlorid and collecting the same, or by working the process at a temperature below the volatilizing point of beryllium chlorid, so that the beryllium chlorid formed, remains in the mass within the furnace, and subsequently treating this mass to recover the beryllium chlorid.

If aluminum is also present with the beryllium containing material the aluminum can be recovered along with the beryllium chlorid, and subsequently separated therefrom.

The process set forth in this application involves the use of a halogen in its elemental form, and the halogen most convenient for use is chlorin, although the other members of the halogen group or family respond by the same reactions with beryllium containing material.

The procedure in utilizing chlorin gas in order to effect the reaction of the process is very similar to that which is described with respect to the use of a salt such as sodium or calcium chlorid.

The material is first crushed to a suitable degree of fineness, and carbon is mixed with it. Preferably the materials are prepared to be in anhydrous condition. Silicon must be present either as an ingredient of the original mineral or material used, or must be added in the form of silica. The material is charged into an electric furnace, and the temperature of the furnace is raised sufficiently, about 1500 C., so that when chlorin gas is passed into the heated mass, reaction will proceed. The temperature of reaction is in the neighborhood of 1500 C. This results in breaking up the beryllium aluminum silicate as the chlorin has great affinity for beryllium and aluminum, and the reaction results in the formation of beryllium chlorid, aluminum chlorid, and chlorids of silicon and carbon monoxid.

The reaction thus described may be expressed by the following empirical formula and reaction:

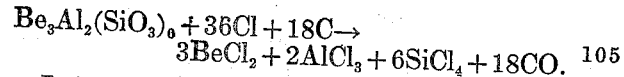

$$Be_3Al_2(SiO_3)_6 + 36Cl + 18C \rightarrow$$
$$3BeCl_2 + 2AlCl_3 + 6SiCl_4 + 18CO.$$

It is preferable, although not essential, to add carbon in some form to the furnace charge. The carbon assists in making the furnace charge a better conductor of electric current.

The temperature of the furnace and the reaction proceedings may be maintained such that the aluminum chlorid and beryllium chlorid is not volatilized. Under these circumstances the silicon tetra chlorid is volatilized and is collected by a suitable condensing apparatus. The beryllium chlorid and aluminum chlorid may be subsequently recovered from the mass as by a leaching process.

As an alternative procedure, the temperature of the furnace is raised sufficiently high to volatilize all the chlorids present, and the chlorids of aluminum and beryllium may be separated from the silicon tetra chlorid by a suitable arrangement of condensers to obtain fractional condensation. The silicon tetra chlorid condenses at a temperature below that at which the aluminum and beryllium chlorid condense.

The beryllium and aluminum chlorids thus collected may be separated in any desired manner. The chlorid of aluminum volatilizes at a lower temperature than the chlorid of beryllium. Consequently, the electric furnace may be first operated to volatilize the silicon tetra chlorid and when this is completed the temperature raised sufficiently to volatilize the aluminum chlorid, but not the beryllium chlorid, and after the aluminum chlorid is volatilized the temperature raised sufficiently to volatilize the beryllium chlorid.

Where desired the process used for the recovery of beryllium may utilize as a first step the use of a halogen compound of an alkali metal or alkaline earth metal, such as sodium chlorid or calcium chlorid, the halogen compound being present only in sufficient quanties to react with the aluminum, and as a later step in the process a halogen such as chlorin gas be used.

In this reaction silica must be present either as a part of the original material or added.

As an example, beryl is mixed with a chlorid, such as calcium chlorid, carbon being present. The amount of calcium chlorid used is the calculated amount to react with the aluminum present, to form aluminum chlorid. This mixture is placed in an electric furnace and sufficient heat developed to cause reaction to proceed. As a result of this reaction aluminum chlorid is formed, together with calcium silicate and beryllium silicate. The temperature of the furnace is then raised sufficiently high so that the aluminum chlorid is volatilized leaving the beryllium silicate in the mass.

After the aluminum chlorid has been volatilized the temperature of the furnace is raised, carbon may be added where desired where there is not sufficient carbon remaining from the original furnace charge, and chlorin gas passed into the residue in the furnace. This produces beryllium chlorid, silicon tetra chlorid, calcium silicate, and carbon monoxid. The temperature of the furnace is controlled so that either the beryllium chlorid is volatilized and collected, or the temperature of the furnace is kept below the volatilizing point of beryllium chlorid, so that the beryllium chlorid remains in the mass within the furnace, from which it may be recovered by any desired method, as by leaching.

The reaction forming the second step of the process just described may be indicated by the empirical formula and equation as follows:

$$3CaSiO_3 + 3BeSiO_3 + 9Cl_2 + 9C \rightarrow \\ 3CaSiO_3 + 3SiCl_4 + 3BeCl_2 + 9CO.$$

If desired the same result as expressed in the foregoing two step process may be obtained in a single reaction within the electric furnace at sufficiently high temperature. Under such circumstances aluminum chlorid, beryllium chlorid, and silicon tetra chlorid are produced and may be recovered by fractional condensation, or if the temperature of the furnace be not sufficiently high to volatilize the aluminum chlorid and beryllium chlorid, these may be recovered from the reacted mass. The reaction with respect to the foregoing procedure may be expressed empirically as follows:

$$Be_3Al_2(SiO_3)_6 + 3CaCl_2 + 9Cl_2 + 9C \rightarrow \\ AlCl_3 + 3BeCl_2 + 3SiCl_4 + 3CaSiO_3 + 9CO.$$

There is another reaction in accordance with which beryllium may be recovered, in which reaction the carbon added to the furnace charge forms carbids of beryllium and aluminum in the first instance, and these carbids are subsequently converted into haloids of beryllium and aluminum by the use of a suitable halogen.

The reaction which proceeds in two steps may be empirically represented as follows:

$$2Be_3Al_2(SiO_3)_6 + 63C \rightarrow 6BeC_2 + \\ Al_4C_3 + 12SiC + 36CO.$$

When this reaction is concluded chlorin gas is passed into the heated mass which results in the following reaction:

$$6BeC_2 + Al_4C_3 + 12SiC + 36Cl_2 \rightarrow \\ 6BeCl_2 + 4AlCl_3 + 12SiCl_4 + 27C.$$

These two steps may be combined as in one reaction, as follows:—

$$Be_3Al_2(SiO_3)_6 + 18C + 18Cl_2 \rightarrow 3BeCl_2 + \\ 2AlCl_3 + 6SiCl_4 + 18CO.$$

Which is the reaction first explained.

When the reaction proceeds according to the last formula the temperature at which the reaction is caused to proceed may be sufficiently high so that the chlorid of beryllium and aluminum are volatilized and subsequently recovered by fractional condensation or the reaction may be caused to proceed at such a temperature as will cause the aluminum chlorid to be first volatilized and after the volatilization of the aluminum chlorid the temperature of the furnace may be raised sufficiently to cause the beryllium chlorid to be volatilized.

On the other hand, the temperature of the reaction may be maintained at such a degree as that the chlorids of aluminum and beryllium will not be volatilized, but sufficiently high to cause reaction to proceed, in which event the chlorids of beryllium and aluminum will remain in the reacted mass and may be recovered in any suitable manner such as leaching.

As further examples of the application of our process to beryllium bearing materials, we mention chrysoberyl which is $Be(AlO_2)_2$, and phenacite which is $Be_2SiO_4$. These minerals respond to our process as before described according to the following reactions:

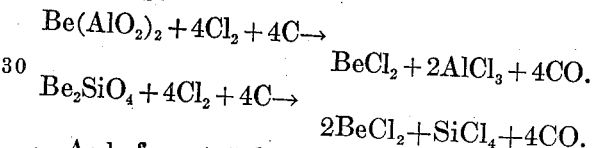

As before stated, the materials which enter into the furnace charge should be properly dried so as to be anhydrous. If this is not done the presence of water will cause the chlorids to be hydrolized, forming hydrochloric acid, which will pass from the furnace as a gas, and there will also be formed beryllium hydrate and aluminum hydrate. The amount of hydrolyzing action which takes place will be in proportion to the amount of water present. Of course, the beryllium hydrate and aluminum hydrate remain in the mass within the furnace, and can be subsequently recovered.

If desired, a sufficient amount of moisture may be initially introduced into the furnace charge to cause a complete hydrolyzing action with respect to the beryllium chlorid and aluminum chlorid. But this process is not so desirable as where the materials are dry and the aluminum and beryllium are recovered by causing the chlorids to be volatilized and subsequently collected.

Having described our invention, we claim:

1. The process of recovering beryllium as a salt of beryllium from an ore, mineral or material containing the same, which consists in heating the beryllium containing material to a sufficient temperature and causing the same to react with a halogen, thereby to form a haloid of beryllium, and recovering the beryllium haloid formed.

2. The process of recovering beryllium as a salt of beryllium from an ore, mineral or material containing the same, which consists in heating the beryllium containing material to a sufficient degree and causing it to react with chlorin, thereby forming a chlorid of beryllium, and in recovering the beryllium chlorid.

3. The process of recovering beryllium as a salt of beryllium from an ore, mineral or material containing the same, which consists in adding to said material carbon, heating the mixture, and causing the same to react with a halogen thereby to form a haloid of beryllium, and recovering the beryllium haloid.

4. The process of recovering beryllium as a salt of beryllium from an ore, mineral or material containing the same, which consists in adding carbon to the said material, heating the mixture to a sufficient degree, and supplying chlorid to the heated mass thereby to form a chlorid of beryllium, and recovering said chlorid of beryllium.

5. The process of recovering beryllium from an ore, mineral or material containing the same, which consists in heating the material in anhydrous condition, supplying a halogen to the heated material, maintaining sufficient temperature to cause the haloid of beryllium formed to volatilize, and collecting the volatilized haloid.

6. The process of recovering beryllium from an ore, mineral or material containing the same, which consists in heating the material in anhydrous condition and supplying chlorin to the heated mass, maintaining sufficient temperature to cause the chlorid of beryllium formed to volatilize, and collecting the volatilized chlorid.

7. The process of recovering beryllium from an ore, mineral or material containing the same, which consists in adding carbon to the material, having silica present, heating the mixture and supplying a halogen to the said material thereby forming a haloid of beryllium, and in recovering the beryllium haloid.

8. The process of recovering beryllium from an ore, mineral or material containing the same, which consists in adding carbon to the material, having silica present, heating the mixture, supplying chlorin to the heated mixture thereby to form a chlorid of beryllium and recovering the beryllium chlorid.

9. The process of recovering beryllium from an ore, mineral or material containing the same, which consists in mixing a halogen salt with said material, which salt will react with the beryllium to form a volatile haloid, having carbon present and having silica present, heating the materials to a temperature at which reaction proceeds, supplying a halogen to the heated mass thereby forming a haloid of beryllium, and collecting the beryllium haloid formed.

10. The process of recovering beryllium from an ore, mineral or material containing the same, which consists in adding to said material a chlorid, which chlorid will react with beryllium to form a volatile haloid, also adding carbon, having silica present, heating the mass to a temperature at which reaction proceeds, supplying chlorin to the heated mass thereby forming beryllium chlorid, and recovering the beryllium chlorid.

11. The process of recovering beryllium from an ore, mineral or material containing the beryllium and aluminum, which consists in adding to said material a halogen salt in sufficient quantity to react with the aluminum present and form a volatile haloid, having silica present, heating the said material to the temperature at which reaction proceeds whereby aluminum chlorid is formed, removing the aluminum chlorid thus formed, mixing the residue with carbon, heating the same, supplying a halogen to said heated mass thereby forming a haloid of beryllium and recovering the beryllium haloid.

12. The process of recovering beryllium from an ore, mineral or material containing beryllium and aluminum, which consists in mixing a chlorid which will react with the aluminum contained in the said material, having silica present, heating the same to a temperature at which reaction proceeds, whereby aluminum chlorid is formed, removing the said aluminum chlorid, heating the remaining mass with carbon present, and supplying chlorin to the heated mass thereby to form beryllium chlorid, and recovering the beryllium chlorid.

13. The process of recovering beryllium from an ore, mineral or material containing beryllium and aluminum, which consists in mixing with said material a chlorid which will react with the aluminum and only in sufficient quantity to react with the aluminum, having silica present, heating the mixture in anhydrous condition to a temperature at which reaction proceeds, and sufficiently high to cause the volatilization of aluminum chlorid, further heating the said material, having carbon present, and supplying chlorin to the heated mass thereby forming beryllium chlorid, and recovering the beryllium chlorid.

In testimony whereof, we hereunto affix our signatures.

HAROLD S. BOOTH.
GEORGE G. MARSHALL.